June 6, 1933. K. L. HERRMANN 1,913,275
ANTIFRICTION BEARING
Filed Nov. 11, 1929
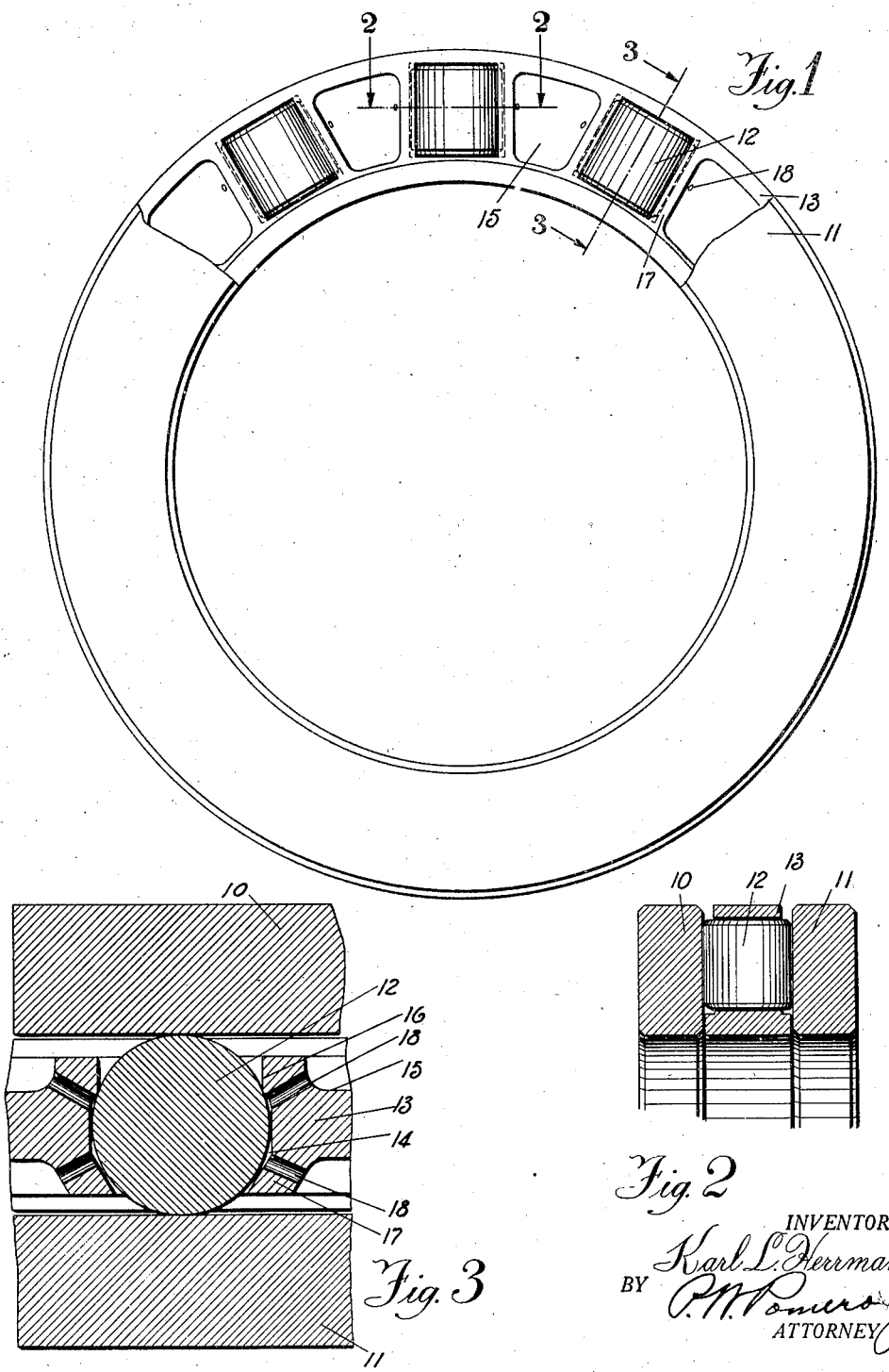

Patented June 6, 1933

1,913,275

UNITED STATES PATENT OFFICE

KARL L. HERRMANN, OF SOUTH BEND, INDIANA, ASSIGNOR TO THE BANTAM BALL BEARING COMPANY, OF SOUTH BEND, INDIANA, A CORPORATION OF INDIANA

ANTIFRICTION BEARING

Application filed November 11, 1929. Serial No. 406,283.

This invention relates to anti-friction bearings and particularly to the retainer for the bearing rollers whereby the rollers are held in fixed relation to facilitate the assembling or disassembling of the parts in the bearing and for the purpose of cleaning or repairing.

One of the objects is to provide a retainer with openings extending therethrough to receive the rollers, there being ledges or flanges projecting into the sides of the openings to prevent the rollers from dropping through the openings at that side of the retainer.

Another object is to form a retainer having roller receiving openings therein in such a manner that the metal at the sides opposite the flanges can be swaged or forced into the openings to prevent removal of the rollers from that side of the retainer.

A further object is to form the retainer so as to provide lubricant chambers between the roller receiving openings and provide passages extending from the chambers into the openings whereby the rollers are automatically lubricated.

A still further object is to provide an anti-friction bearing comprising a plurality of rollers mounted in a retainer having openings cast therein to receive the rollers, the retainer having flanges formed thereon extending into the sides of the openings to prevent the rollers passing through the openings in one direction, and the metal at the opposite sides of the openings being forced out of its normal position to prevent the rollers from dropping out of the openings in the opposite direction.

The above being among the objects of the present invention, the same consists of certain mechanical details and combination of parts to be hereinafter described, and then claimed, having the above and other objects in view.

In the accompanying drawing which illustrates a suitable embodiment of the present invention, Figure 1 is a plane view of the bearing, certain parts being broken away to better show the invention.

Figure 2 is a sectional view taken on the line 3—3 of Figure 1.

Figure 3 is a sectional view taken on the line 2—2 of Figure 1.

Referring to the drawing in which like numerals refer to like parts throughout the several views, the anti-friction bearing comprises a pair of spaced bearing rings 10 and 11 between which are mounted a plurality of rollers 12 held in spaced relation to each other by means of the retainer 13. The retainer 13 is preferably a casting which has a plurality of openings 14 extending therethrough of suitable size to receive the rollers 12 and maintain the same against undue movement or shifting in the openings. The retainer 13 is preferably cast so that depressions 15 are formed in one or both faces of the same intermediate the openings 14 for a purpose to be hereinafter described.

In casting the retainer ring 13, I preferably form flanges 16 in the sides of the openings 14 at one side face of the retainer, the flanges 16 being projected into the openings a sufficient distance to prevent the rollers 12 from passing or dropping through the openings in the direction of the flanges 16.

After the rollers 12 have been inserted into the openings 14, the metal at the sides thereof on the side face of the retainer 13 opposite to the flanges 16 is preferably forced or swaged into the openings 14 as is clearly shown in Figure 3 to provide retaining portions 17 for the rollers 12 at that side of the retainer. It will be seen from the foregoing description that when the rollers 12 are spaced in the openings 14 in the retainer 13 and the metal at 17 is forced into the openings, that the rollers 12 are held in fixed relation in the retainer whereby the same are prevented from dropping out of the retainer during the time of assembling the bearing or when disassembling the parts of the bearing for the purpose of cleaning the same, or for repair, or for other reasons.

The depressions formed in the retainer 13 intermediate the openings 14 provide chambers in which a lubricant, such as a heavy grease, can be placed for lubricating the rollers, passages 18 being provided which extend from the lubrication chambers to the openings 14 which permit the passage of the lubricant from the containing chambers to the openings.

While I have shown the retainer as having depressions 15 formed in both faces thereof and passages 18 extending from the chambers 15 to the openings 14, it will be readily apparent that if so desired, these lubrication chambers can be formed in only one face of the retainer or that the same can be staggered to thereby provide one-half the number of lubricant chambers to that shown in the drawing.

While I have shown one embodiment of my invention, it is to be understood that formal changes and changes relating to details of construction and manufacture may be resorted to without departing from the spirit and substance of my invention, the scope of which is commensurate with the appended claim.

What I claim is:

A roller bearing comprising, spaced bearing rings, a plurality of spaced rollers thrust positioned therebetween, and a retainer for said rollers comprising a cast ring having a plurality of openings extending therethrough receiving said rollers for maintaining them in spaced relation between said rings, said retainer also having depressions between said openings adapted to hold a lubricant, the walls forming said depressions adjacent to said rollers being pressed into said openings to retain said rollers in position therein, and passages extending from said depressions to said openings through said roller retaining walls to permit lubrication of said rollers.

Signed by me at South Bend, Indiana, this 5th day of November, 1929.

KARL L. HERRMANN.